Patented Aug. 12, 1924.

1,504,850

UNITED STATES PATENT OFFICE.

TRUMON N. WOODRUFF, OF LOWGAP, NORTH CAROLINA.

METHOD OF TREATING GALAX LEAVES.

No Drawing. Application filed May 14, 1923. Serial No. 639,021.

*To all whom it may concern:*

Be it known that TRUMON N. WOODRUFF, a citizen of the United States, residing at Lowgap, in the county of Surry and State of North Carolina, have invented certain new and useful Improvements in a Method of Treating Galax Leaves, of which the following is a specification.

This invention appertains to means of dyeing and preserving foliage used for decorative purposes and the primary object of the invention is the provision of an improved method by which the fresh galax leaf can be effectively dyed and preserved, so as to enhance the beauty thereof and to insure its longevity.

Before my discovery of the method of dyeing and preserving galax leaves it was impossible to preserve galax leaves by the ordinary method used in preparing and preserving of magnolia leaves, oak, beech and the like in view of the fact that the galax leaf was too tender and tended to shrink, dry out and become useless under the action of the chemicals used to preserve the same.

In the treatment of galax leaves there are two distinct phases of procedure, namely the dyeing of the leaves and second the preserving of the leaves.

The value and necessity of my invention is more readily apparent, when it is understood that the natural bronze and green galax leaves are extensively used by all florists in making funeral wreaths and that tens of thousands of leaves are used annually. Now the fresh leaves require a lot of time and attention, such as moisture, refrigeration and the like to keep them in condition for use by the florists. When the leaves are treated by my improved process and method the above mentioned care of the leaves is entirely eliminated.

According to my invention I first place the galax leaves in a cement vat containing a solution of aniline dyes kept at a temperature of from 190° to 196° Fahrenheit. The leaves are retained in the vat for approximately twenty minutes. The dye in the solution varies, but is added sufficient to produce the desired shade of color.

To every three hundred and ten gallons of the dye solution I add three pounds of common table salt, which causes the color to set. After the leaves have been allowed to remain in the vat the time stated, the same are removed and placed in the preserving solution.

In dyeing other foliage, it is customary to boil the same, and I entirely eliminate this step in view of the fact that the galax leaves are tender and will not stand a boiling temperature. Instead of the boiling operation I substitute therefor table salt which, as stated, sets the dye and produces a darker color than the leaves would ordinarily take on without the boiling temperature.

In order to preserve the leaves I place the colored leaves in large vats containing a solution of calcium chloride to which I add a small quantity of slaked lime and glycerine. The specific gravity of the solution varies from 90° to 100°.

In making the solution, I prefer to use three and one-eighth pounds of calcium chloride (granulated C. C. 75% pure) to each one gallon of water. There may be a slight variation according to temperature of the solution to make the desired gravity, but this is the average. Ten pounds of slaked lime is added to each six hundred gallons of solution, which counteracts the acidity of the same. One half pound of glycerine is added to each six hundred pounds of the solution.

The base of this solution can be used over and over again for a great many immersions, adding from time to time sufficient calcium chloride to keep up the specific gravity.

As far as I have been able to ascertain, the preserving solution for all other foliage consists of chloride and water of a specific gravity of 120° to 130°.

The leaves are left in the vats from seven to ten days, after which they are removed and will be in a perfect state of preservation.

The glycerine is placed in the preserving solution to give a gloss to the leaves, while the lime sweetens the solution and prevents the solution from burning the galax leaves, which has been the trouble in preserving the tender galax leaves heretofore. Under certain conditions the glycerine can be omitted, such as when a gloss is not desired on the leaves.

From the foregoing description, it can be seen that I have provided a novel and simple means for preserving galax leaves, which will permit the effective dyeing and preserving thereof.

Changes in details may be made without departing from the spirit or the scope of this invention.

What I claim as new is:

1. The method of treating galax leaves which consists in first placing the leaves in a dyeing solution containing table salt and then immersing the leaves in a preserving compound.

2. The method of treating galax leaves which consists in immersing the leaves for twenty minutes in an aniline dye solution containing table salt and then immersing the leaves in a preserving solution.

3. The method of treating galax leaves which consists in dyeing the leaves and then immersing the leaves in a solution containing calcium chloride and slaked lime.

4. The method of treating galax leaves which consists in first immersing the leaves in a dyeing solution, second, immersing the leaves in a preservative solution containing calcium chloride, slaked lime and glycerine.

5. The method of treating galax leaves which consists in immersing the leaves in a dyeing solution and second immersing the dyed leaves in a preservative solution for seven days consisting of calcium chloride, water, slaked lime and glycerine having a specific gravity of approximately 95°.

6. The method of treating galax leaves consisting of immersing dyed leaves in a calcium chloride solution containing slaked lime.

7. The method of treating galax leaves consisting of immersing the leaves in a solution of calcium chloride, slaked lime and glycerine.

8. The method of preserving galax leaves consisting of soaking the leaves for approximately seven days in a solution containing calcium chloride, slaked lime and glycerine having a specific gravity of substantially 95°.

9. The method of dyeing galax leaves consisting of immersing the leaves for twenty minutes in a solution of aniline dye containing table salt.

10. A preservative compound for foliage used for decorative purposes consisting of calcium chloride, slaked lime and glycerine.

11. A preservative compound for foliage used for decorative purposes consisting of calcium chloride and slaked lime.

12. A preservative compound for foliage used for decorative purposes comprising water six hundred gallons, calcium chloride one thousand eight hundred and seventy five pounds, slaked lime ten pounds and glycerine one half pound.

In testimony whereof I affix my signature in presence of two witnesses.

TRUMON N. WOODRUFF.

Witnesses:
G. W. TODD,
H. M. TODD.